(12) United States Patent
Griffin (10) Patent No.: US 10,769,762 B2
(45) Date of Patent: Sep. 8, 2020

(54) MOTOR VEHICLE CAMERA DEVICE WITH HISTOGRAM SPREADING

(71) Applicant: Connaught Electronics Ltd., Tuam, County Galway (IE)

(72) Inventor: Mark Patrick Griffin, Galway (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 155 days.

(21) Appl. No.: 15/515,801

(22) PCT Filed: Oct. 2, 2015

(86) PCT No.: PCT/EP2015/072786
§ 371 (c)(1),
(2) Date: Mar. 30, 2017

(87) PCT Pub. No.: WO2016/050954
PCT Pub. Date: Apr. 7, 2016

(65) Prior Publication Data
US 2017/0243337 A1 Aug. 24, 2017

(30) Foreign Application Priority Data
Oct. 2, 2014 (DE) .......................... 10 2014 114 328

(51) Int. Cl.
*G06T 5/00* (2006.01)
*H04N 5/235* (2006.01)
(Continued)

(52) U.S. Cl.
CPC ............... *G06T 5/009* (2013.01); *B60R 1/00* (2013.01); *G06T 5/40* (2013.01); *H04N 5/235* (2013.01);
(Continued)

(58) Field of Classification Search
CPC ................................ G06T 5/009; H04N 5/235
(Continued)

(56) References Cited

U.S. PATENT DOCUMENTS

2006/0274161 A1* 12/2006 Ing .......................... H04N 5/235
348/229.1
2007/0146296 A1* 6/2007 Kang ................... G09G 3/3406
345/102
(Continued)

FOREIGN PATENT DOCUMENTS

| JP | 2009/058377 A | 3/2009 |
| JP | 2009058377 A * | 3/2009 |
| WO | 2014/116715 A1 | 7/2014 |

OTHER PUBLICATIONS

International Search Report issued in corresponding application No. PCT/EP2015/072786 dated Jan. 20, 2016 (3 pages).
(Continued)

Primary Examiner — Joshua D Taylor
(74) Attorney, Agent, or Firm — Osha Liang LLP (57) ABSTRACT

A camera device for a motor vehicle includes an image sensor to provide a raw image (R) of an environment of the camera device. Additionally, an image processing device generates an output image (I) from the raw image (R) by means of a spreading function of a histogram spreading. The spreading function generates from a respective input pixel value (Li) of each pixel of the raw image (R) each one output pixel value (Lo) of a corresponding pixel of the output image (I). Furthermore, the histogram spreading may be adapted to the capturing situation. At least one parameter value (S, G) of the camera device depending on a brightness (B1, B2) of the environment is acquired and a limit value (L) for the output pixel values (Lo) is set in the spreading function depending on the at least one acquired parameter value (S, G).

12 Claims, 5 Drawing Sheets

(51) Int. Cl.
   *B60R 1/00*    (2006.01)
   *G06T 5/40*    (2006.01)
   *H04N 5/238*   (2006.01)
   *H04N 5/243*   (2006.01)
   *H04N 9/04*    (2006.01)
   *H04N 9/73*    (2006.01)

(52) U.S. Cl.
   CPC ........... *H04N 5/238* (2013.01); *H04N 5/2351* (2013.01); *H04N 5/2353* (2013.01); *H04N 5/243* (2013.01); *H04N 9/04* (2013.01); *H04N 9/735* (2013.01)

(58) Field of Classification Search
   USPC .......................... 348/208.6, 229.1, 362, 148
   See application file for complete search history.

(56) References Cited

U.S. PATENT DOCUMENTS

| | | | | |
|---|---|---|---|---|
| 2009/0251563 | A1* | 10/2009 | Mochida | G03B 7/08 |
| | | | | 348/229.1 |
| 2013/0050516 | A1* | 2/2013 | Hojo | H04N 5/23254 |
| | | | | 348/208.6 |
| 2013/0076974 | A1* | 3/2013 | Atkins | H04N 5/235 |
| | | | | 348/362 |

OTHER PUBLICATIONS

Written Opinion of the International Searching Authority issued in corresponding application No. PCT/EP2015/072786 dated Jan. 20, 2016 (5 pages).

* cited by examiner

MOTOR VEHICLE CAMERA DEVICE WITH HISTOGRAM SPREADING

BACKGROUND

The invention relates to a method for operating a camera device for a motor vehicle. A raw image of an environment of the camera device is provided by an image sensor of the camera device. By an image processing device, an output image is generated from the raw image based on histogram spreading. A camera device for performing the method as well as a motor vehicle with the camera device are also associated with the invention.

In generating a raw image by means of an image sensor, this raw image can have an undesirably low dynamic range. If the raw image for example has pixels, the pixel values of which are each represented by 8 bits per color value or 8 bits for the luminance value or brightness value, thus, each pixel for each color or for the brightness can virtually have 256 different values in total, for example pixel values from 0 to 255. In a raw image of the image sensor, there is correspondingly a darkest pixel, the pixel value of which is smallest, and a brightest pixel, the pixel value of which is greatest. The value interval limited by the darkest pixel and the brightest pixel represents the dynamic range of the raw image. For example, if the darkest pixel has a brightness value of 30 and the brightest pixel has a brightness value of 120, thus, the raw image has a dynamic from 30 to 120. This is lower than the maximally possible dynamic range extending from 0 to 255 (with 8-bit pixel values).

In order to improve the dynamic range, the histogram spreading is known, which determines from a respective input pixel value of each pixel of the raw image each one output pixel value of a corresponding pixel of an output image by means of a spreading function. Then, the output image can be further used instead of the raw image. In the prior art, it is known to design the spreading function such that the darkest pixel, in the example the value 30, is mapped to the value 0. The brightest pixel, in the example the value 120, is mapped to the maximally possible pixel value, thus for example 255. Between the darkest pixel and the brightest pixel, then, it is interpolated by the spreading function, for example by a linear interpolation or by a so-called S-curve. By the histogram spreading, the image contrast in the output image improves compared to the raw image.

In using a camera device for a motor vehicle, the image contrast is not crucial in all situations. One has observed situations, in which the recognizability of image regions was deteriorated by the improvement of the image contrast by means of histogram spreading. This entails that a driver of a motor vehicle can no longer use the camera device as an assistance to for example park the motor vehicle. In particular, one has ascertained that with particularly low ambient light, thus, if the brightness of the environment of the motor vehicle is below a predetermined threshold value, by the histogram spreading, image areas in the raw image, which are already relatively dark, are further darkened by the histogram spreading. Then, the driver can no longer recognize image details in the output image.

Current vision systems may enable histogram stretching to an image as a simple enable disable function.

SUMMARY OF DISCLOSURE

The invention is based on the object to adapt the histogram spreading in a camera device to the capturing situation.

The object is solved by the subject matters of the independent claims. Advantageous developments of the invention are apparent from the features of the dependent claims.

According to the invention, a method for operating a camera device for a motor vehicle is provided. By an image sensor of the camera device, for example a black/white image sensor or a color image sensor or an infrared image sensor, a raw image of the environment of the camera device is provided. The raw image can for example represent an environmental region external to vehicle or inside the vehicle. The image sensor can also be a video image sensor, which generates a sequence of raw images. Herein, the method can be individually performed for each raw image. The raw image can for example have a size of X×Y pixels, wherein X and Y each can for example be in a range from 40 to 600.

An output image is generated from the raw image by an image processing device. The image processing device can for example be a controller or a circuit integrated in a camera housing. The image processing device can for example have a DSP (digital signal processor) or a microcontroller. The image processing device determines from a respective input pixel value of each pixel of the raw image each one output pixel value of a corresponding pixel of the output image. Here, corresponding means that the pixel can have the same image coordinates or pixel coordinates. The image processing device uses a stretching function or spreading function of a histogram stretching or histogram spreading. As already described, the spreading function can for example be a linear or straight spreading function or an S-curve function.

In the method according to the invention, at least one parameter value of the camera device depending on a brightness of the environment is acquired. The at least one parameter value thus correlates with a brightness of the environment. Depending on the at least one acquired parameter value, at least one limit value for the output pixel values is set in the spreading function. Thus, a maximum value and/or a minimum value can for example be set. In other words, the output image has pixels, in which the darkest pixel and/or the brightest pixel is respectively limited by a limit value to the bottom in case of the darkest pixel or to the top in case of the brightest pixel by the respective limit value.

A camera device for a motor vehicle is also associated with the invention, which is adapted for performing an embodiment of the method according to the invention. To this, the camera device has an image sensor for providing a raw image, which represents or images an environment of the camera device. Furthermore, the camera device has an image processing device for generating an output image from the raw image, wherein the output image is generated based on a histogram spreading. Herein, the camera device performs an embodiment of the method according to the invention.

By the invention, the advantage arises that based on the at least one parameter value depending on the brightness of the environment, it is signaled if the capturing situation, in which the raw image has been generated, is low or high in light. Correspondingly, then, the histogram spreading can be adapted by means of the limit value such that the following situations arise. If a brightness value of the brightness of the environment is less than a predetermined minimum value, thus, by a limit value greater than zero, it is in particular prevented that image regions, which are already very dark in the raw image, appear even darker in the output image. Similarly, by a corresponding limit value less than the maximum value, it can be prevented that bright image regions of the raw image appear even brighter and thereby overexposed in the output image and hereby details are difficultly recognizable.

In an embodiment of the invention, the limit value of the spreading function is set such that a histogram of the pixel values of the output image has a dynamic range, which is smaller than the maximally possible dynamic range of the pixel values. Hereby, the maximization of the image contrast is avoided, which can be disadvantageous in some exposure situations in the initially described manner.

In an embodiment of the invention, the limit value is set independently of a histogram of the input pixel values of the raw image. In other words, the dynamic range of the raw image does not have any influence on the limit value. Hereby, advantageously, a minimum brightness of the pixels of the output image is ensured.

In an embodiment of the invention, by the spreading function, as the input pixel value, a brightness value and/or a color value of the pixel of the raw image are respectively imaged to an output pixel value of the corresponding pixel of the output image. The application of the spreading function to brightness values, that is the luminance of the pixel, has the advantage that color distortions can be avoided even with curved spreading function. The use of a spreading function for color values has the advantage that the pixel values of the pixels of the raw image, which indicate the color values red, green, blue (RGB), do not have to be expensively converted.

In an embodiment of the invention, a minimum value for the output pixel values is determined by the limit value. In other words, a minimum brightness for all of the pixels of the output image is set. Hereby, the advantage arises that with an environmental brightness with a brightness value, which is less than a minimum brightness, all of the pixels of the output image at least have the minimum value.

Therein, the minimum value is preferably set the greater, the darker the environment is. In other words, there is a first brightness value of the brightness of the environment, which is less than a second brightness value of the brightness of the environment. Then, a first minimum value is set to the first brightness value, which is greater than a second minimum value, which is set for the second brightness value.

The limit value can be continuously set depending on the at least one parameter value. However, in a preferred embodiment, the limit value is stepwise switched. Hereby, the advantage arises that the histogram spreading does not change its imaging behavior between the switching steps. This favors the convergence behavior of downstream image processing algorithms.

In an embodiment, a first switching step is in a range from 0.3 lux to 0.8 lux of the brightness of the environment. A second switching step is preferably in a range from 1.5 lux to 2.5 lux of the brightness of the environment. A third switching step can be in a range from 8 lux to 12 lux. In the third or a further switching step, preferably, the limit value is set to a minimum value or a maximum value according to whether the limit value is a minimum brightness or a maximum brightness. Preferably, the minimum value is 0, that is the histogram spreading is performed with the last switching step at higher brightness values such that the histogram of the pixel values of the output image has the maximum dynamic range.

In an embodiment of the invention, the at least one parameter value, which signals the brightness, includes a sensor value of a brightness sensor. In other words, the brightness of the environment is directly measured by means of the brightness sensor. Hereto, the acquisition range of the brightness sensor is directed into the environment. By this embodiment, the advantage arises that information about the brightness in the environment is directly present with the sensor value.

In an embodiment of the invention, the at least one parameter value includes an exposure period adjusted in generating the raw image. Another designation for exposure period is also closure time or shutter speed. A unit for exposure is for example 1/100 s or 1/80 s.

In an embodiment, the at least one parameter value includes an image sensor gain adjusted in generating the raw image. Another designation for image sensor gain is also gain or ISO value. Examples for ISO values are 100 ISO, 200 ISO, 3.400 ISO.

In an embodiment of the invention, the at least one parameter value includes a shutter value adjusted in generating the raw image. Another designation for shutter value is also aperture value. Examples for aperture values are F5 and F11.

The three mentioned parameter values of the capturing parameters of exposure period, gain and aperture value have the advantage that they are already determined in generating the raw image for example by an exposure control. Such an exposure control can be the device present in a conventional camera device, which provides for automatic exposure adjustment. Therefore, the three mentioned parameters are usually already present in usual camera types and do not have to be separately determined for setting the limit value.

A further advantage arises if a temperature of the image sensor is acquired and the limit value is set depending on the acquired temperature. Hereby, sensor noise of the image sensor in the output image can be masked or reduced.

A motor vehicle is also associated with the invention. The motor vehicle according to the invention has at least one embodiment of the camera device according to the invention. The motor vehicle according to the invention can for example be configured as a passenger car or truck or passenger bus. The camera device can for example be configured as a parking assistance or as a night vision assistance or also be provided in the motor vehicle interior for observing passengers on a rear seat of the motor vehicle.

BRIEF DESCRIPTION OF DRAWINGS

In the following, an embodiment of the invention is described. There show.

DETAILED DESCRIPTION

The embodiment explained in the following is a preferred embodiment of the invention. However, in the embodiment, the described components of the embodiment each represent individual features of the invention to be considered independently of each other, which each develop the invention also independently of each other and thereby are also to be regarded as a component of the invention in individual manner or in another than the shown combination. Furthermore, the described embodiment can also be supplemented by further features of the invention already described.

Figure 1:
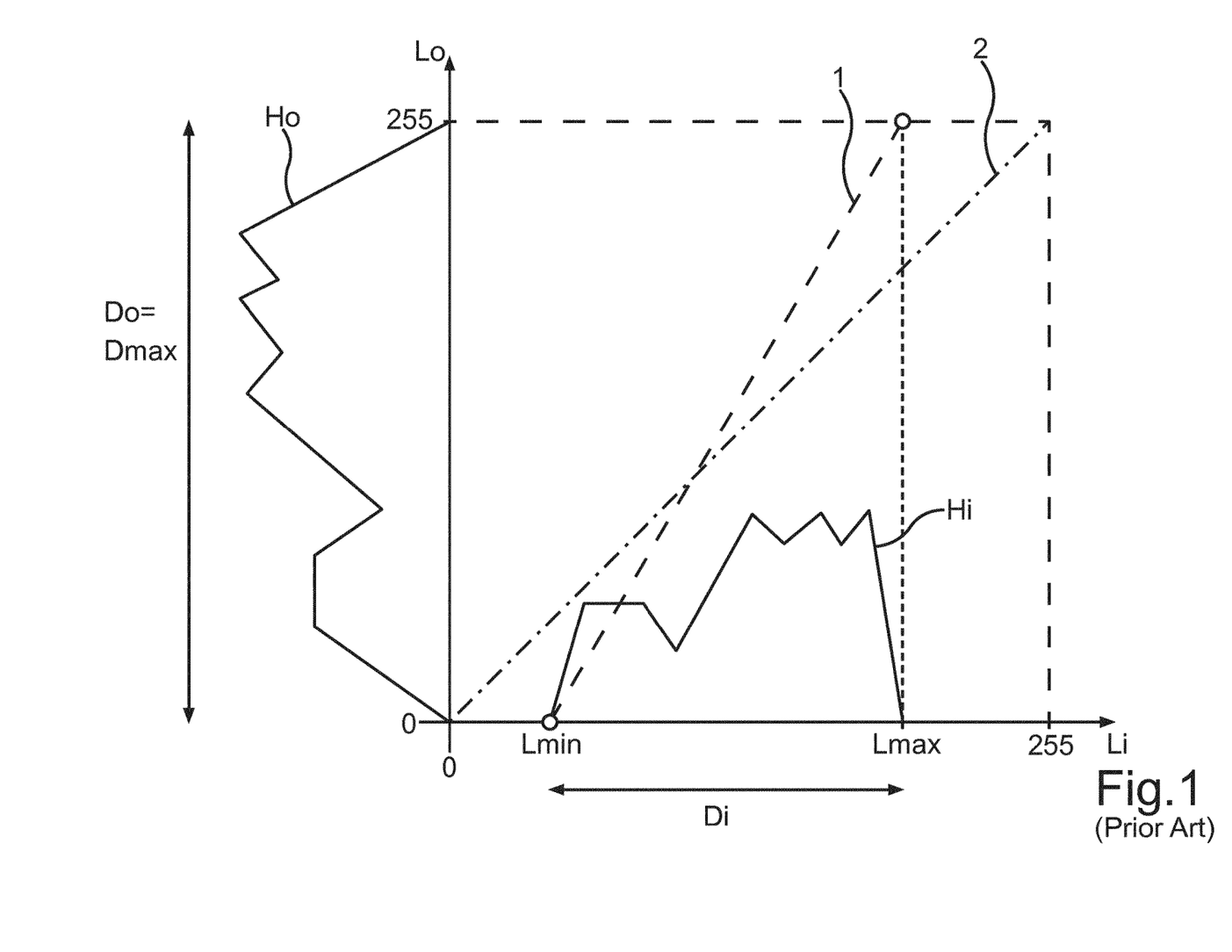
FIG. 1 a diagram for illustrating a histogram spreading according to the prior art, FIG. 2 a schematic illustration of an embodiment of the motor vehicle according to the invention, FIG. 3 a diagram for illustrating a histogram spreading according to the method according to the invention, FIG. 4 a diagram for illustrating the method, wherein a limit value other than in FIG. 3 is set, FIG. 5 a diagram with an exemplary histogram for a raw image.

In FIG. 1, a histogram spreading is illustrated, as it is known from the prior art. An input histogram Hi is illustrated, that is a histogram, which can be formed of pixel values of pixels of a raw image of a camera sensor. In the shown example and also in the further examples, it is assumed that each pixel can have a pixel value, which can be in a range from 0 to 255, that is an 8-bit pixel value. The pixel value can for example be a luminance value Li or hue value of the pixel. The smallest brightness value is denoted by Lmin. The greatest brightness value is denoted by Lmax. The dynamic range Di of the raw image is defined by the brightness values Lmin and Lmax.

Figure 5:
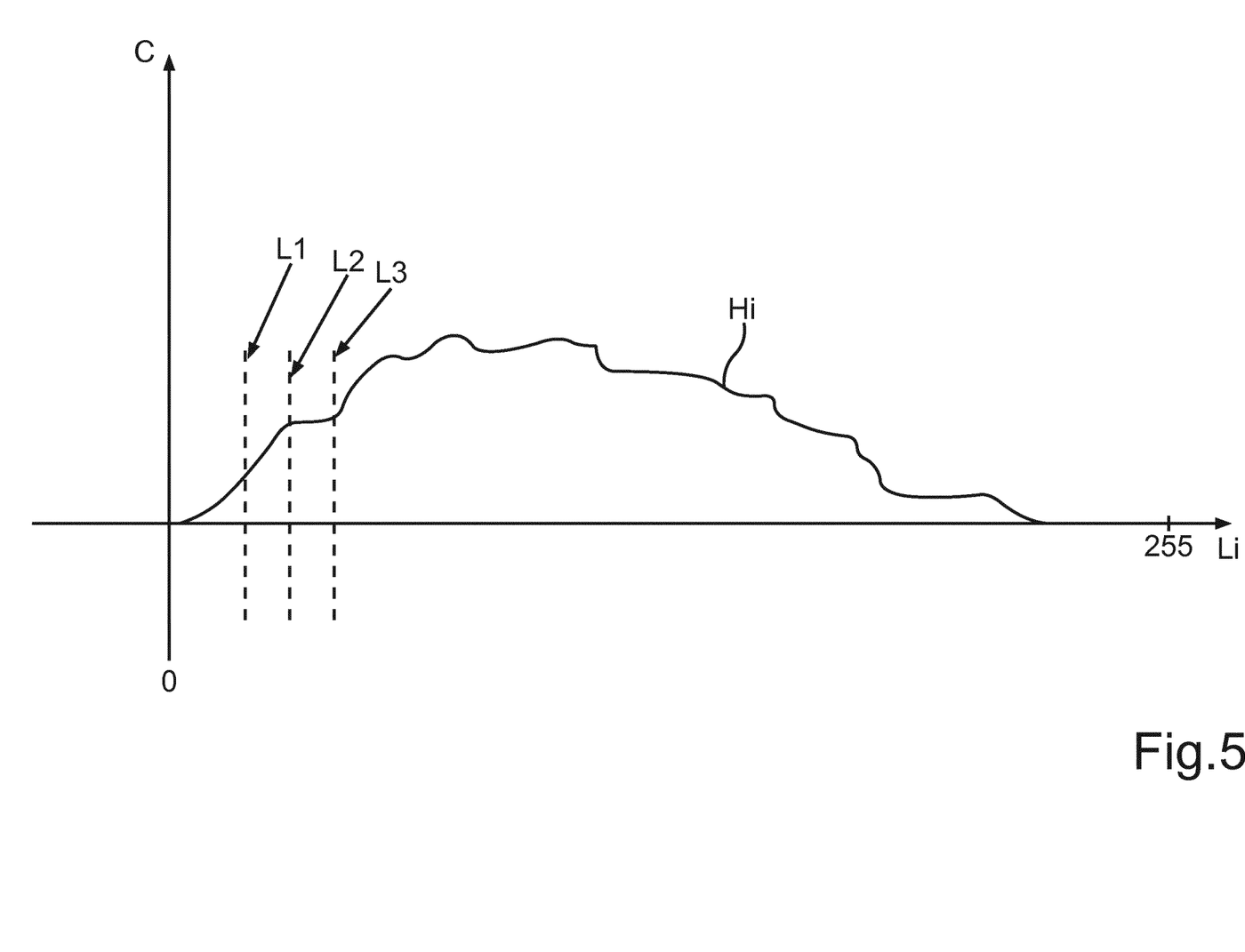

The input histogram Hi can be formed in the manner illustrated in FIG. 5. In FIG. 5, it is presented how for the input luminance values Li of the raw image, for each possible luminance value between 0 and 255, a number C (count) of those pixels is determined, which have the corresponding luminance value Li. Hereby, the input histogram Hi results.

In FIG. 1, it is exemplified, how input luminance values Li can be mapped to output luminance values Lo by a spreading function 1 to generate from the raw image by pixel-wise transformation of the respective pixel value of each pixel of the raw image a pixel value for a corresponding pixel of the output image. Hereby, the output image arises. This output image has an output histogram Ho depending on the spreading function 1.

According to the prior art, the spreading function 1 is selected such that the smallest brightness value Lmin of the raw image is mapped to the minimum luminance value 0. The greatest brightness value Lmax of the raw image is mapped to the maximally possible luminance value, here 255. For better orientation, the identity function 2 is also registered in the diagram. By the spreading function 1, the output histogram Ho has luminance values having the full dynamic range Dmax. In other words, the maximum dynamic range Dmax includes the value 0 and the value 255.

Figure 2:
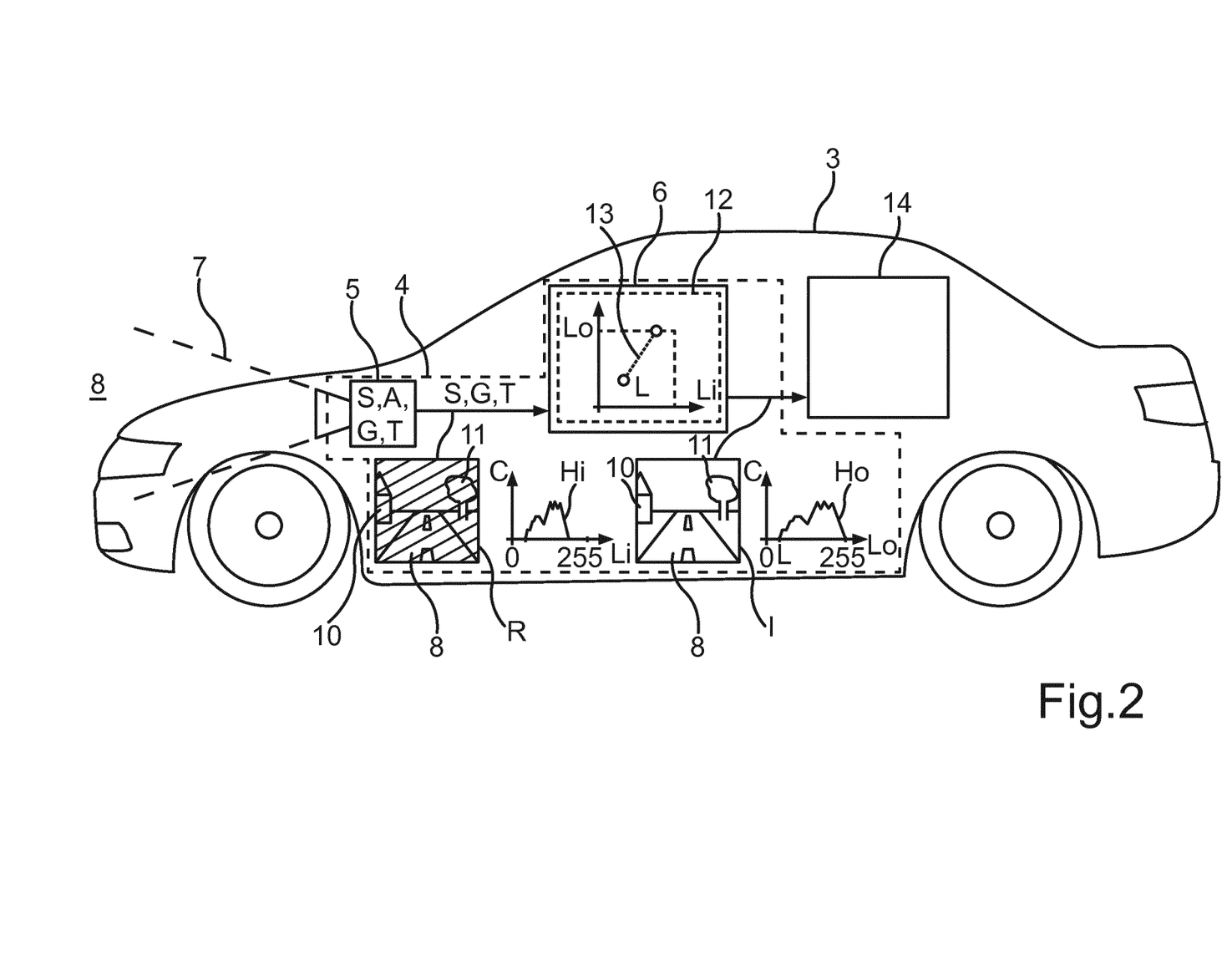

In FIG. 2, a motor vehicle 3 is illustrated, which can for example be a passenger car. The motor vehicle 3 can have a camera device 4, which can include a camera sensor 5 and an image processing device 6. A capturing range 7 of the camera sensor 5 can for example be oriented into an environment 8 of the motor vehicle 3, for example into a front area of the motor vehicle 3 (as illustrated) or (not illustrated) into a rear area of the motor vehicle 3 or into a vehicle interior of the motor vehicle 3. In a manner known per se, the image sensor 5 can be adapted to generate an image sequence of individual raw images R. For generating the raw image R, thus a capture of the environment 8, the exposure period S (shutter speed), an aperture A (aperture) and/or an image sensor gain or gain G can be set, which then represent capturing parameters for the raw image R. In the shown example, in the raw image R of the environment 8, a road 9 located in front of the motor vehicle 3, a house 10 and a tree 11 are imaged. In the shown example, it is to be assumed that the raw image R is relatively dark. In other words, a brightness in the environment 8 can be relatively low as it can for example occur in night drive or in a drive in a tunnel. From this, an input histogram Hi for the raw image R results as it is also exemplarily illustrated in FIG. 2. The luminance values Li do not reach the maximally possible luminance value, which can here be assumed as 255.

A histogram spreading 12 can be provided by the image processing device 6. The histogram spreading 12 can for example be realized by a program module of a processor of the image processing device 6. The processor 6 can for example be a digital signal processing processor (DSP). The histogram spreading can include a parameterizable spreading function 13, which can have a limit value L (limit) as a parameter. By means of the spreading function 13, in a manner as was already described in connection with the spreading function 1 in FIG. 1, an output image I can be generated from the raw image R. Herein, the output image I can have an overall brightness, which is greater than the overall brightness of the raw image R. An output histogram Ho is exemplarily also illustrated in FIG. 2 for the output luminance values Lo of the output image I. Herein, the limit value L of the spreading function 13 constitutes a minimum value for the histogram values of the output histogram Ho.

In the motor vehicle 3, it can be provided that the output image I is transmitted to a further vehicle component 14. The vehicle component 14 can for example be a display device such as for example a screen. A driver of the motor vehicle 3 can then view the output image I on the display device and hereby see the environment 8. However, the vehicle component 14 can for example also be a driver assistance system, which can assist a driver in driving the motor vehicle 3. For example, the vehicle component 14 can then include an image recognition device, by which the road 8 and/or the house 10 and/or the tree 11 can be recognized, i.e. generally objects, in the output image I.

Figure 3:
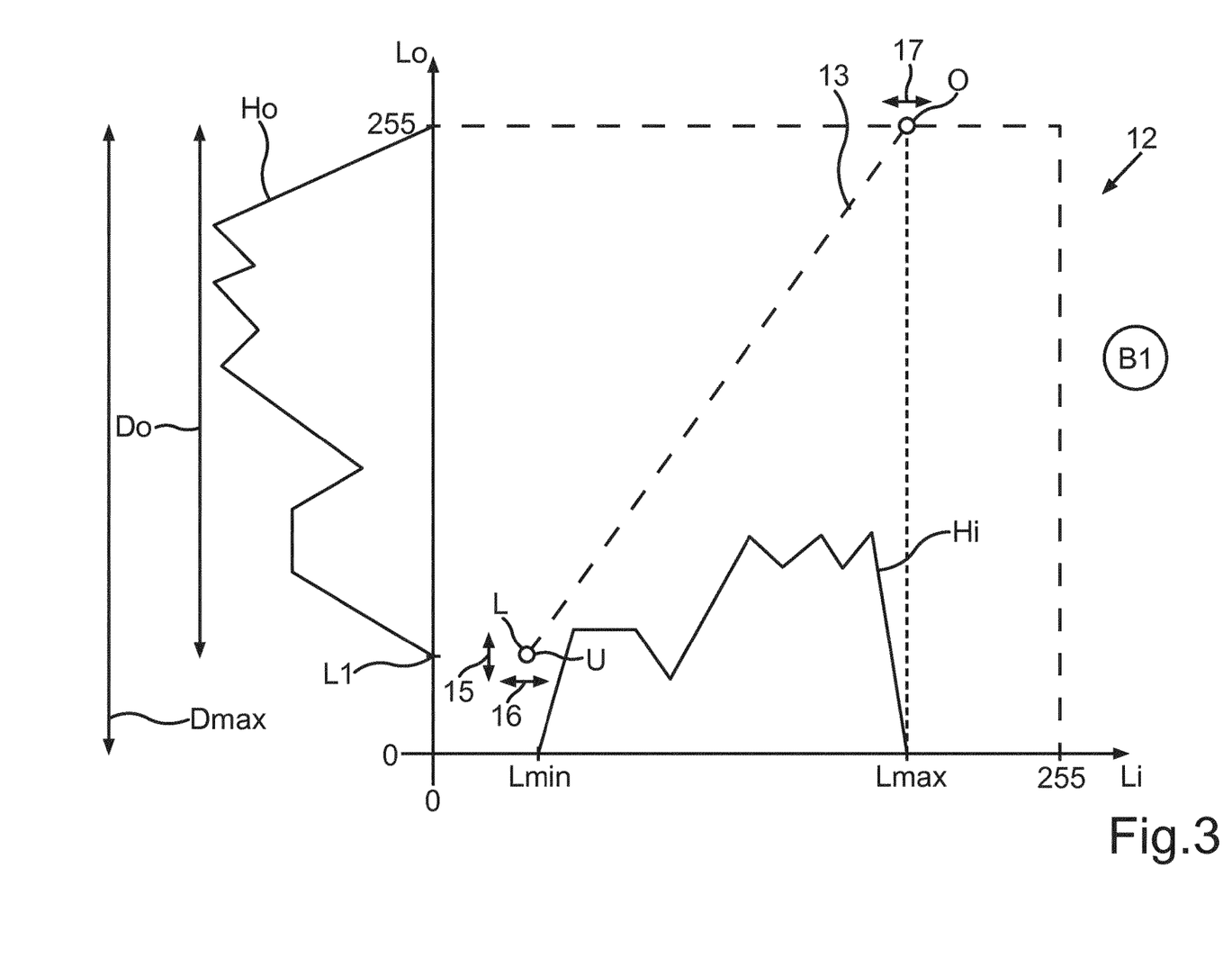
Figure 4:
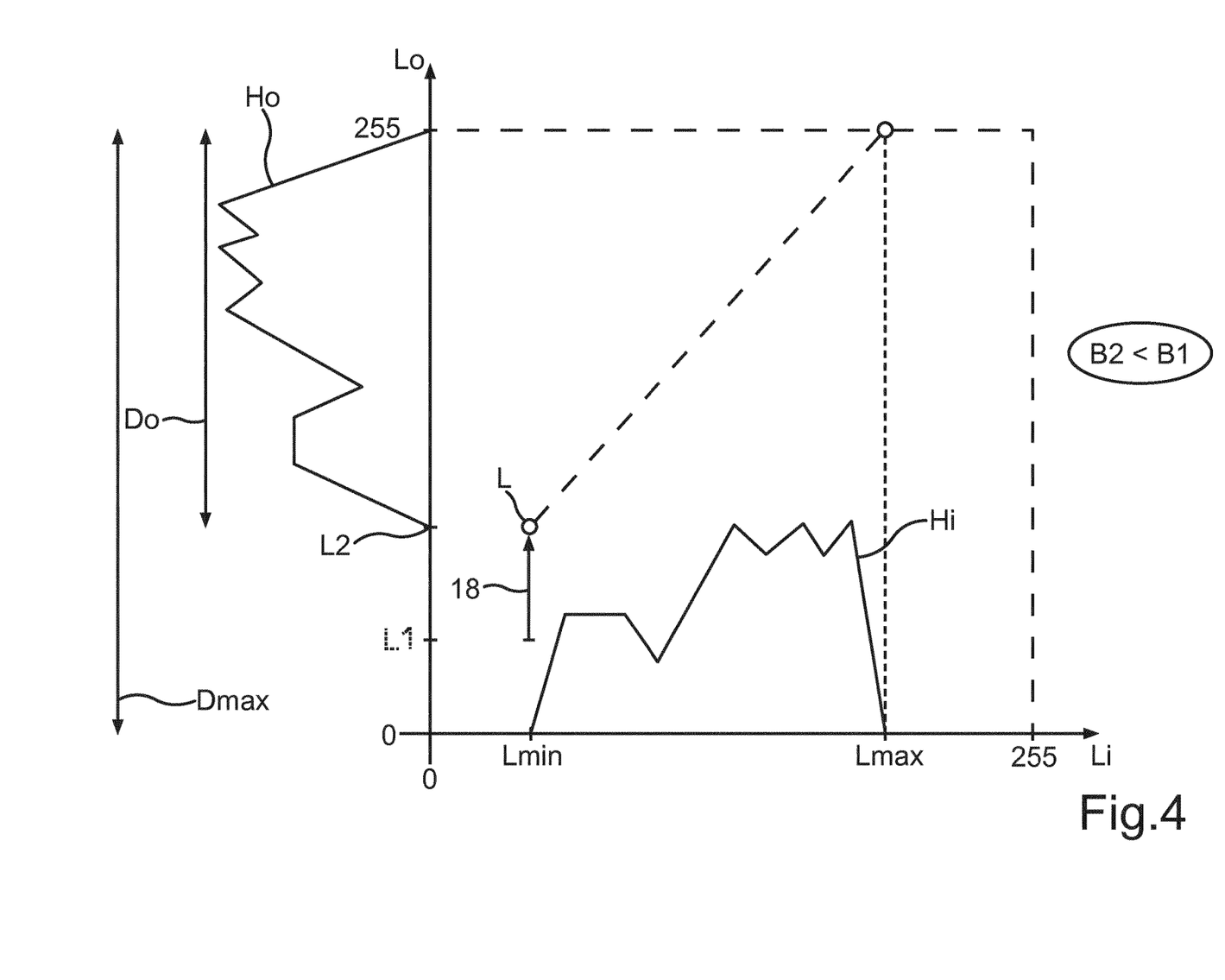

In FIG. 3 and FIG. 4, the operation of the histogram spreading 12 is explained for two capturing situations.

To this, in FIG. 3 and FIG. 4, each in the same manner as already explained in connection with FIG. 1, an input histogram Hi of the raw image R and an output histogram Ho of the output image I after histogram spreading 12 are shown. The histogram spreading 12 is performed by means of the spreading function 13, which can have the limit value L as a curve parameter. In the shown example, the limit value L is the minimum value for the output luminance values Lo of the pixels of the output image I. In other words, by the limit value L, an ordinate setting or ordinate displacement 15 of a lower limit U of the spreading function 13 can be determined. In the spreading function 13, an abscissa position 16 of the lower limit U and an abscissa position 17 of an upper limit O of the spreading function 13 can be set such that the lower limit U as the abscissa value corresponds to the minimum value Lmin of the input histogram Hi and the abscissa value 17 of the upper limit O corresponds to the maximum value Lmax of the input histogram Hi.

In the motor vehicle 3, the limit value L can be set depending on a brightness of the environment 8 or depending on a parameter value correlated with the brightness, for example the exposure period S and/or the gain G. To this, the exposure period S or the gain G can for example be transmitted from the image sensor 5 to the image processing device 6, as it is illustrated in FIG. 2. In the shown example, for an environmental brightness value B1, values for the closure period S and/or the gain G have arisen, by which the limit value L has been set to a value L1 by the image processing device 6. Correspondingly, an output histogram Ho results, which extends from the lower limit L1 to the maximum value, here 255, and hereby has a dynamic range Do, which is smaller than the maximum dynamic range Dmax.

In FIG. 4, a capturing situation is shown, in which a brightness value B2 of the capturing situation is less than the brightness value B1 of the capturing situation illustrated in FIG. 3. In other words, it is a capture of the raw image R at lower brightness. By the image processing device 6, in the example, the limit value was correspondingly switched from the value L1 to the value L2, which is greater than the value L1, for example by a switching operation 18. Hereby, the dynamic range Do of the output histogram Ho decreases.

Thus, limits are applied to the histogram stretching that adjust for the light levels of the environment that the imager sees. The light levels of the scene can be determined by monitoring the exposure and gain controls of the image, based on these readings we can adjust the histogram stretching limits of the image to give a brighter image at very low light and less bright and higher contrast at slightly higher light levels.

Histogram stretching increases the contrast of the image. Histogram stretching can be either enabled or disabled on the system. Enabling applies a histogram stretching to the image across the max to min grayscale. Limits can be applied to the scale of the histogram. The image processing device applies limits on the histogram that can be dynamically updated based on the exposure gain of the imager (in other words based on the light level of the scene that the imager sees). By limiting the lower level of the histogram we can make the image brighter at very low light levels (reducing contrast). The side effect of this is as the light level increases the images at light level 10 lux.

This invention will provide a limit at the lower level of the histogram at very low light (brightening the image) but dynamically updates the limit as the scene gets brighter, therefore keeping the contrast of the scene.

The desired effect of the invention is to have limit L2 at very low lightlevels (approx. 0.5 lux), and reading the exposure and gain controls of the imager dynamically update the histogram to limit 1 at a light level of 2 lux. Then once the exposure gain of the image is a value corresponding to a light level ~10 lux or above (when brightening the image is no longer required for example) switch to an unlimited histogram stretching image (increasing contrast to the max possible).

Example Use Cases of Desired Achievement:

At a very low light level (0.5 lux) (exposure and gain values would be high) we would like to apply histogram A (limit L2). At 0.5 lux, unlimited histogram stretching has a high contrast but the image is not very bright. We would like to apply histogram A with limit 2. This applies a limit to how dark pixels can be, pulling the darker luminance values to a brighter luminance value. The desired effect of this invention is to have limit 2 Histogram at very low light levels (brightens the image). We can only brighten to a certain extent without reducing the contrast too much).

At a higher light level (2 lux) (exposure and gain values would be less than at 0.5 lux) we would like to apply histogram B (Limit L1): At 2 lux, unlimited histogram stretching provides an image with a high contrast but still a little dark. We would like to apply histogram B with limit 1 that brightens the image slightly while a high contrast level is kept up.

To dynamically update histogram limits we use the gain and exposure values of the image:

imager exposure=e imager gain=g

Limit 1 exposure/gain Threshold=E1 or G1

Limit 2 exposure/gain Threshold=E2 or E2

Unlimited=E3 or G3

Histogram Stretching Limit=L

Sample Logic:

```
If e > E1 or g > G1
{
L = limit_1
}
else if e > E2 or g > G2
{
L = limit_2
}
else if e > E3 or g > G3
{
L = no limit = 0
}
```

In addition, the invention can adjust the limit in response to the imager temperature to mitigate the influence of noise into the limit calculation.

Overall, the example shows, how a histogram spreading with dynamic limitation can be provided by the invention to adjust the limitation depending on the image sensor exposure period and/or the image sensor gain.

What is claimed:

1. A method for operating a camera device for a motor vehicle, comprising:
providing a raw image of an environment of the camera device by an image sensor of the camera device; and
generating an output image from the raw image by an image processing device, which determines from a respective input pixel value of each pixel of the raw image each one output pixel value of a corresponding pixel of the output image by a spreading function of a histogram spreading,
wherein at least one parameter value of the camera device depending on a brightness of the environment is acquired and a limit value for the output pixel values is set in the spreading function depending on the at least one acquired parameter value, and
wherein the limit value is set independently of a histogram of the input pixel values of the raw image,
wherein a minimum value is set for the output pixel values by the limit value, and
wherein the minimum value is inversely proportional to the brightness of the environment.

2. The method according to claim 1, wherein the limit value of the spreading function is set such that a histogram of the pixel values of the output image has a dynamic range, which is smaller than the maximally possible dynamic range of the pixel values.

3. The method according to claim 1, wherein by the spreading function, as the input pixel value, a brightness value and/or a color value of the pixel of the raw image are respectively mapped to an output pixel value of the corresponding pixel of the output image.

4. The method according to claim 1, wherein the limit value is stepwise switched.

5. The method according to claim 4, wherein a first switching step is in a range from 0.3 lux to 0.8 lux, a second switching step is in a range from 1.5 lux to 2.5 lux, and a third switching step is in a range from 8 lux to 12 lux, wherein in the third switching step, the limit value is set to a minimum value or a maximum value.

6. The method according to claim 1, wherein the at least one parameter value includes a sensor value of a brightness sensor and an acquisition range of the brightness sensor is directed into the environment.

7. The method according to claim 1, wherein the at least one parameter value includes an exposure period adjusted in generating the raw image.

8. The method according to claim 1, wherein the at least one parameter value includes an image sensor gain adjusted in generating the raw image.

9. The method according to claim 1, wherein the at least one parameter value includes an aperture value adjusted in generating the raw image.

10. The method according to claim 1, wherein a temperature of the image sensor is acquired and the limit value is set depending on the acquired temperature.

11. A camera device for a motor vehicle, comprising:
- an image sensor for providing a raw image of an environment of the camera device;
- an image processing device for generating an output image from the raw image based on a histogram spreading,
- wherein the camera device is configured to perform a method according to claim 1.

12. A motor vehicle with at least one camera device according to claim 11.

* * * * *